US008278258B2

(12) United States Patent
McCormick et al.

(10) Patent No.: US 8,278,258 B2
(45) Date of Patent: Oct. 2, 2012

(54) ACID INHIBITOR COMPOSITIONS FOR METAL CLEANING AND/OR PICKLING

(75) Inventors: David R. McCormick, Clawson, MI (US); Thomas S. Smith, II, Novi, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 97 days.

(21) Appl. No.: 12/196,657

(22) Filed: Aug. 22, 2008

(65) Prior Publication Data

US 2009/0032057 A1 Feb. 5, 2009

Related U.S. Application Data

(63) Continuation of application No. PCT/US2007/061420, filed on Feb. 1, 2007.

(51) Int. Cl.
*C11D 17/00* (2006.01)

(52) U.S. Cl. ......... 510/258; 510/259; 510/263; 510/264

(58) Field of Classification Search .................. 166/304, 166/312, 307; 106/304, 312, 307
See application file for complete search history.

(56) References Cited

U.S. PATENT DOCUMENTS 2,182,306 A 12/1939 Ulrich
2,208,095 A 7/1940 Esselmann et al.
2,553,696 A 5/1951 Wilson
2,606,873 A 8/1952 Cardwell et al.
2,806,839 A 9/1957 Crowther et al.
3,033,746 A 5/1962 Moyle et al.
3,077,454 A 2/1963 Monroe et al.
3,049,496 A 8/1964 Monroe et al.
3,249,548 A 5/1966 Herman et al.
3,251,778 A 5/1966 Dickson et al.
3,301,783 A 1/1967 Dickson et al.
3,316,179 A 4/1967 Hoornstra et al.
3,321,507 A 5/1967 Ginnasi et al.
3,627,687 A 12/1971 Teumac et al.
3,630,933 A 12/1971 Dudlik et al.
3,819,527 A 6/1974 Hayman, Jr.
3,932,296 A 1/1976 Byth
3,957,595 A 5/1976 DuBrow et al.
4,028,268 A 6/1977 Sullivan, 3rd et al.
4,229,267 A 10/1980 Steinecker
4,310,435 A 1/1982 Frenier
4,312,999 A * 1/1982 Shields ......................... 564/278
4,370,256 A 1/1983 Oakes
4,386,000 A 5/1983 Turner et al.
4,440,661 A 4/1984 Takeuchi et al.
4,493,775 A 1/1985 Coffey et al.
4,557,838 A 12/1985 Nichols et al.
4,597,838 A 7/1986 Bammel
4,670,186 A 6/1987 Quinlan
4,900,458 A 2/1990 Schroeder et al.
5,384,064 A 1/1995 Peterson
6,192,987 B1 * 2/2001 Funkhouser et al. ......... 166/304
6,329,206 B1 12/2001 Bershas
6,525,013 B1 2/2003 Littig et al.
2005/0126427 A1 * 6/2005 Gonzalez et al. ............ 106/1.16

FOREIGN PATENT DOCUMENTS

EP 0 192 130 B1 6/1990

OTHER PUBLICATIONS

International Search Report and Written Opinion Dated Jun. 25, 2007—Application No. PCT/US2007/06140, Applicant Henkel Kommanditgesellschaft Auf Aktien et al.

Wang, Yanzhi "Composite Inhibitor for Aluminum Alloy in Hydrochloric Acid", Department of Environment and Chemical Engineering, Yanshan University, Peoples Republic of china, Cailiao Baohu (2002), 35(6), 18-20, published by Cailiao Baohu Zazhishe.—English Abstract attached as presented in CA Selects: Corrosion, Published by Chemical Abstracts, Document No. 138:244790, Entered STN: Dec. 30, 2002.

* cited by examiner

*Primary Examiner* — Necholus Ogden, Jr.
(74) *Attorney, Agent, or Firm* — Mary K. Cameron

(57) ABSTRACT

An acid inhibitor concentrate is provided which contains water, at least one polyamino-aldehyde resin such as a quaternized polyethylenepolyamine-glyoxal resin, and at least one compound selected from the group consisting of acetylenic alcohols, ethoxylated fatty amines, ethoxylated fatty amine salts, and aldehyde-releasing compounds (such as hexamethylenetetramine). Such concentrates form useful metal cleaning and pickling solutions when combined with aqueous acid, wherein such solutions, when contacted with a metal surface, are effective in removing scale, smut and other deposits from the metal surface but exhibit a reduced tendency for the aqueous acid to attack or etch the metal itself.

36 Claims, No Drawings

ACID INHIBITOR COMPOSITIONS FOR METAL CLEANING AND/OR PICKLING

CROSS-REFERENCE TO RELATED APPLICATIONS

This application is a continuation under 35 U.S.C. Sections 365(c) and 120 of International Application No. PCT/US2007/061420, filed Feb. 1, 2007 and published on Aug. 20, 2007 as WO 2007/098308, which claims priority from U.S. Provisional Patent Application Ser. No. 60/775,883 filed Feb. 23, 2006 and U.S. Provisional Patent Application Ser. No. 60/799,065 filed May 9, 2006, which are incorporated herein by reference in their entirety.

FIELD OF THE INVENTION

This invention relates to acid inhibitor concentrates and solutions prepared therefrom which are useful for the acid pickling and/or cleaning of metal surfaces.

BACKGROUND OF THE INVENTION

It is known to utilize certain compounds or mixtures of compounds in acidic solutions that are utilized for cleaning or pickling metal surfaces to remove therefrom unwanted oxides, scale and other undesirable corrosion products. Such compounds reduce the tendency of the acidic cleaning solution to corrode the metal surface without interfering with the cleaning operation performed by the solution. Compounds that function in this manner are generally referred to as "acid inhibitors". In the absence of acid inhibitors, an acidic metal cleaning or pickling solution can cause significant base metal loss and also damage to the metal surface as a result of excessive hydrogen exposure.

The corrosion of metal surfaces by acidic cleaning solutions is caused by the acids present in the solution. Acids generally used in such metal cleaning or pickling solutions are the so-called "non-oxidizing" acids. Included in this category are inorganic (mineral) acids such as hydrochloric acid, phosphoric acid, sulphamic acid, sulphonic acid and sulfuric acid and organic acids such as acetic acid, citric acid, formic acid, glycolic acid and oxalic acid.

The acid component of the cleaning solution is effective in removing undesirable deposits from metal surfaces, but unfortunately it also tends to attack and corrode the base metal. Such corrosion is obviously very undesirable. To counteract the corrosive effects of the acid, acid inhibitors are added to the cleaning solution.

An effective inhibitor must disperse throughout the pickling solution in low concentrations, must suppress hydrogen evolution, and must not leave excessive smut or residual film on the surface of the metal. It must also maintain effectiveness over a range of acid and iron concentrations and temperatures, with such effectiveness being long lasting so that the metal pickling or cleaning solution need not be frequently discarded or replenished.

Many types of acid inhibitor compositions are known in the art, with several being available commercially. However, in many cases such formulations contain undesirably high concentrations of certain substances such as formaldehyde or acetylenic alcohols which are toxic and/or flammable and thus are subject to strict regulation due to environmental, health and safety concerns. Further, it is desirable for cost and convenience reasons to market such acid inhibitor compositions in the form of concentrates that are diluted and combined with aqueous acid solutions to prepare a metal pickling or cleaning solution. Alternatively, such concentrates are used to replenish working metal pickling or cleaning solutions that have become depleted or that no longer have the desired degree of effectiveness with respect to acid inhibition. Acid inhibitor concentrates must remain stable over prolonged periods of time so that they may be safely stored until being combined with aqueous acid to form or replenish a metal pickling or cleaning solution. That is, the concentrate should remain a homogeneous solution (e.g., no phase separation or precipitation of solids) and should not deteriorate or degrade in effectiveness to a significant extent. Moreover, the solutions prepared from such concentrates must meet stringent customer requirements with respect to cost and performance (e.g., inhibition of metal etching), both immediately and over time (e.g., as iron levels in the solution increase upon continued use of the solution).

Further improvements in the art of acid inhibitor concentrates and metal cleaning and pickling solutions would therefore be desirable.

BRIEF SUMMARY OF THE INVENTION

The present invention provides an acid inhibitor concentrate comprising water, at least one polyamino-aldehyde resin and at least one compound selected from the group consisting of acetylenic alcohols, ethoxylated fatty amines, ethoxylated fatty amine salts and aldehyde-releasing compounds. Such concentrates form useful metal cleaning and pickling solutions when combined with aqueous acid. These solutions, when contacted with a metal surface such as a steel, aluminum alloy, or zinc surface, are effective in removing scale and other deposits from the metal surface while exhibiting a reduced tendency for the aqueous acid to attack or etch the metal itself. The metal cleaning and pickling solutions of the present invention, as compared to solutions prepared using conventional types of acid inhibitors, exhibit particularly good protection against base metal etching when the solution contains high levels of iron and is maintained at a relatively high temperature over an extended period of time.

One aspect of the invention provides an acid inhibitor concentrate comprising water, at least one polyamino-aldehyde resin and at least one compound selected from the group consisting of aldehyde-releasing compounds, ethoxylated fatty amines, ethoxylated fatty amine salts and acetylenic alcohols. The acid inhibitor concentrate may comprise one or more of: at least one formaldehyde-releasing compound, hexamethylenetetramine or a salt thereof, at least one polyethylenepolyamine-aldehyde resin, at least one polyamino-glyoxal resin, and at least one polyethylenepolyamine-glyoxal resin.

In one embodiment, the acid inhibitor concentrate comprises at least one polyethylenepolyamine-glyoxal resin obtained by reacting a quaternized polyethylenepolyamine with glyoxal. Desirably, the quaternized polyethylenepolyamine is obtained by reacting a polyethylenepolyamine with benzyl chloride.

In one embodiment, the acid inhibitor concentrate comprises at least one ethoxylated fatty amine or salt thereof and at least one aldehyde-releasing compound. In one embodiment, the acid inhibitor concentrate comprises at least one ethoxylated fatty amine or salt thereof and at least one acetylenic alcohol.

In one embodiment, the acid inhibitor concentrate has a pH of from about 4 to about 6. In another embodiment, acid inhibitor concentrate has a pH of greater than about 7 and a free formaldehyde content of less than about 0.1 weight percent.

In one embodiment, the acid inhibitor concentrate comprises at least one quaternized polyethylenepolyamine-glyoxal resin, hexamethylenetetramine or salt thereof, and at least one ethoxylated fatty amine or salt thereof.

In one embodiment, the acid inhibitor concentrate comprises less than 1 weight percent free formaldehyde.

Another aspect of the invention is a solution comprising water, at least one non-oxidizing acid, at least one polyamino-aldehyde resin, and at least one compound selected from the group consisting of aldehyde-releasing compounds, ethoxylated fatty amines, ethoxylated fatty amine salts and acetylenic alcohols. In one embodiment, the solution comprises hydrochloric acid. In one embodiment, the solution comprises at least one formaldehyde-releasing compound. In one embodiment, the solution comprises hexamethylenetetramine or a salt thereof. In one embodiment, the solution comprises at least one polyethylenepolyamine-aldehyde resin. In one embodiment, the solution comprises at least one polyamino-glyoxal resin. In one embodiment, the solution comprises at least one polyethylenepolyamine-glyoxal resin.

In one embodiment, the solution comprises at least one polyethylenepolyamine-glyoxal resin obtained by reacting a quaternized polyethylenepolyamine with glyoxal. Desirably, the quaternized polyethylenepolyamine is obtained by reacting a polyethylenepolyamine with benzyl chloride.

In one embodiment, the solution comprises at least one ethoxylated fatty amine.

In one embodiment, the solution comprises at least one aldehyde-releasing compound and at least one ethoxylated fatty amine or salt thereof.

In one embodiment, the solution has a pH of less than about 3.

In one embodiment, the solution comprises at least one quaternized polyethylenepolyamine-glyoxal resin, hexamethylenetetramine or salt thereof, and at least one ethoxylated fatty amine or salt thereof.

Acid inhibitor concentrates and/or solutions according to the invention may be free of acetylenic alcohol. Acid inhibitor concentrates and/or solutions according to the invention may also be free of fluorosurfactant.

Acid inhibitor concentrates and/or solutions according to the invention may be comprised of 2-butyne-1,4-diol.

Another aspect of the invention is a method of cleaning or pickling a substrate having a metal surface, the method comprising contacting the metal surface with a solution according to the invention described herein. Desirably the metal surface is an iron-containing metal surface, an aluminum-containing metal surface, a zinc-containing metal surface or a combination thereof.

In one embodiment, the invention provides a method of cleaning or pickling a substrate having a metal surface, the method comprising: a). forming a solution by combining water, at least one non-oxidizing acid, at least one polyamino-aldehyde resin, and at least one compound selected from the group consisting of aldehyde-releasing compounds, ethoxylated fatty amines, ethoxylated fatty amine salts and acetylenic alcohols; and b). contacting the metal surface with the solution.

In one embodiment, the solution is formed by combining a concentrate comprised of water, the at least one non-oxidizing acid, the at least one polyamino-aldehyde resin, and the at least one compound selected from the group consisting of aldehyde-releasing compounds, ethoxylated fatty amines, ethoxylated fatty amine salts and acetylenic alcohols with an aqueous solution of the at least one non-oxidizing acid.

In another embodiment, the solution is formed by combining a) a first concentrate comprised of an aqueous solution of at least one aldehyde-releasing compound and having an alkaline pH, b) a second concentrate comprised of an acidified aqueous solution of at least one polyamino-aldehyde resin, and c) an aqueous solution of the at least one non-oxidizing acid.

DETAILED DESCRIPTION OF CERTAIN EMBODIMENTS OF THE INVENTION

The acid inhibitor concentrates of the present invention may contain one or more polyamino-aldehyde resins. Such resins may be described as the reaction products of polyamine compounds and aldehydes and preferably are sufficiently water soluble at 25 degrees C. so as to permit their incorporation into the concentrates at levels of at least about 1 weight %, preferably at least about 2 weight %, most preferably at least about 3 weight %. Although acid inhibitor concentrates based on non-modified polyamines (i.e., polyamines that have not been reacted with aldehyde) also exhibit some degree of acid etch inhibitory effects, modifying the polyamine with aldehyde has been found to provide significant enhancement in performance. The enhancement is particularly pronounced, for example, where an iron-containing substrate is contacted with an HCl-containing solution at elevated temperatures and/or in the presence of dissolved iron and where an aluminum-containing substrate is contacted with an HCl-containing solution at elevated temperatures. The polyamino-aldehyde resins may be in cationic, salt and/or quaternized form so as to increase their water solubility and/or effectiveness to the desired extent. Water-miscible organic solvents such as glycol ethers, glycols, ketones, alcohols, esters and the like may also be used to solubilize the polyamino-aldehyde resin (and other organic components) in the concentrate, but preferred concentrates in accordance with the present invention contain no or essentially no (e.g., less than 1 weight %) volatile organic solvents. Preferably, the components of the acid inhibitor concentrate are selected such that the closed cup flash point of the concentrate is greater than 80 degrees C. (alternatively, greater than 100 degrees C.).

The polyamine compounds suitable as starting materials for the polyamino-aldehyde resin may be generally described as organic compounds containing two or more (e.g., three, four, five or six or more) nitrogen atoms per molecule and preferably are water soluble. For example, the polyamine compound may be prepared by polymerization or oligomerization of one or more nitrogen-containing monomers or by condensation of two or more nitrogen-containing substances. Such polymerization, oligomerization or condensation may involve other molecules in addition to the nitrogen-containing monomers or nitrogen-containing substances. For example, non-nitrogen containing compounds may be utilized as comonomers and/or as polymerization initiators.

Generally speaking, it is desirable for the polyamine compound to contain a plurality of nitrogen atoms (e.g., three or more or four or more or five or more nitrogen atoms) in the backbone of a polymeric chain containing covalently bonded repeating units or moieties. For example, the ratio of nitrogen atoms to carbon atoms preferably may be at least about 0.2, more preferably at least about 0.4. It will generally be preferred for the nitrogen atoms to be present in the form of amine groups, which may be primary, secondary, tertiary or quaternary in structure. The number average molecular weight of the polyamine is not believed to be particularly critical and may, for example, be as low as 200, 400, 600, 800, 1000 or 2000 Daltons and as high as 2,000,000, 1,000,000, 750,000, 500,000, 250,000 or 100,000 Daltons.

Polyalkylenepolyamines (sometimes also referred to as polyalkyleneinines or polyalkylenimines) represent a particularly desirable type of polyamine compound for use in preparing the polyamino-aldehyde resin. Such materials are well-known in the art and are described, for example, in U.S. Pat. Nos. 2,182,306; 3,033,746; 2,208,095; 2,806,839; 2,553,696; and 3,251,778, each of which is incorporated herein by reference in its entirety. The polyalkylenepolyamines which can be used as starting materials for the polyamino-aldehyde resins used in the acid inhibitor concentrates contemplated by the present invention include the oligomeric and polymeric materials that can be prepared by reacting ammonia or other nitrogen-containing compounds with alkylene dihalides (e.g., ethylene dichloride) or by the ring-opening polymerization of substituted or unsubstituted 1,2-alkyleneimines (e.g., ethyleneimine). The polyalkylenepolyamine may be linear or branched in structure and may contain some crosslinking. The nitrogen atoms present in the polyalkylenepolyamine may be primary, secondary, tertiary, and/or quaternary (i.e., ammonium). Polyethylenepolyamines may be obtained from commercial sources such as BASF, which sells certain polyethylenepolyamines under the trademarks "Polynin" and "Lupasol". Suitable polyethylenepolyamines include oligomers and polymers comprised of repeating units having the structure (—$CH_2CH_2NH$—), although other types of repeating units may also be present.

Suitable polyalkylenepolyamines also include copolymers of different imines as well as copolymers of imines with non-imine monomers. The polyalkylenepolyamine may be modified or derivatized before being reacted with the aldehyde to form the polyamino-aldehyde resin utilized as a component of the acid inhibitor concentrates and metal cleaning and pickling solutions of the present invention. As used herein, the term "polyalkylenepolyamine" includes all such modified or derivatized substances. For example, the polyalkylenepolyamine may be alkoxylated (e.g., ethoxylated, propoxylated) by reacting with an alkylene oxide such as ethylene oxide and/or propylene oxide. The polyalkylenepolyamine may also be acylated, alkylated, and/or olefinated. Such derivatizations are described in more detail in U.S. Pat. Nos. 3,301,783 and 3,251,778, each incorporated herein by reference in its entirety.

Salts of the polyalkylenepolyamine or other polyamine may also be utilized, with such salts generally being formed by adding an acid to an aqueous solution of the polyamine compound.

Other suitable polyamine compounds may include, for example, polyvinylamines, polyallylamines, polyvinylguanidines, and the like.

In one embodiment of the invention, the polyamine compound is quaternized (prior to reaction with aldehyde) in a known manner such as, for example, by the reaction thereof with one or more quaternizing agents.

Suitable quaternizing agents for reaction with the polyamine compound include the lower (C1-C10) alkyl or alkenyl halides such as methyl chloride, methyl bromide, or methyl iodide; ethyl chloride, ethyl bromide, or ethyl iodide; or alpha chloroglycerol; dialkyl sulfates such as dimethyl sulfate, diethyl sulfate, dipropyl sulfates, or dibutyl sulfates; aralkyl halides such as benzyl chloride (an especially preferred quaternizing agent); lower alkyl esters of aryl sulfonates such as methyl toluene sulfonate and methyl benzene sulfonate; alkylhalo esters such as ethyl-chloroacetate; alkylene halohydrins such as ethylenechlorohydrin or alkylene oxides such as ethylene oxide or propylene oxide; alpha halo acetic acid derivatives, for example, alpha chloro ethyl acetate, alpha chloro acetamide, alpha chloro sodium acetate; haloketones such as chloroacetone; lactones, for example, propiolactone and sultones such as propane sultone. It will be appreciated by those skilled in the art that quaternization reactions do not easily go to completion and usually a degree of substitution less than 100% (e.g., up to 40%, up to 60% or up to 80%) is achieved and can be quite effective for purposes of the present invention. Thus, it should be understood that it is possible that only a fi-action of the nitrogen atoms in a quaternized polyamine compound may in fact be quaternized.

Particularly preferred polyamine compounds suitable for use in preparing the polyamino-aldehyde resins include those substances classified as CAS 68603-67-8 ("Amines, polyethylenepoly-, reaction products with benzyl chloride").

Quaternized polyamine compounds suitable for use in the present invention are also available from commercial sources, including, for example, CHEMQUAT SP-1060 and CHEMQUAT SP-2060 (available from C&F Chemicals, Inc. of Exton, Pa.).

The aldehyde (aldehydes) which is (are) reacted with the polyamine compound or compounds to form the polyamino-aldehyde resin may be selected from the group of organic compounds containing one or more aldehyde (—CHO) functional groups (or equivalents or precursors thereof) per molecule. The aldehyde may be aliphatic, aromatic or araliphatic in character. Illustrative suitable aldehydes include formaldehyde, C2-C6 aliphatic aldehydes (including dialdehydes), benzaldehyde, glutaraldehyde, acetaldehyde, paraformaldehyde, glyoxal, furfural, methylglyoxal, malondialdehyde, succindialdehyde, and the like, with glyoxal being particularly preferred. The term "aldehyde" as used herein includes not only compounds containing one or more —CHO groups per molecule, but also equivalents and related derivatives) precursors or forms thereof (including groups capable of forming aldehyde groups in situ). For example, in 40% aqueous solution, glyoxal exists mainly in the form of a hydrated monomer, together with a dioxolane dimer and two bis(dioxolane) trimers. As will be explained later herein, aqueous solutions of glyoxal may conveniently be used in the preparation of the polyamino-aldehyde resins which can be a component of the acid inhibitor concentrates and metal cleaning and pickling solutions of the present invention.

Reaction of the aldehyde(s) and polyamine compound(s) to obtain the polyamino-aldehyde resins utilized in the acid inhibitor concentrates of the present invention may be carried out under any suitable conditions known in the art for reacting such types of substances. However, it will generally be desirable to utilize conditions effective to yield resins having a relatively high degree of water solubility. That is, it is preferred that the resin produced be capable of being dissolved in water at 25 degrees C. at concentrations of at least 5 weight %, alternatively at least 10 weight % or at least 20 weight %. One method of preparing the resins is to combine aqueous solutions of the aldehyde(s) and polyamine compound(s) in the desired ratio at ambient temperature. Exothermic reaction of these components will generally take place, with reaction generally being substantially complete within about 1 hour. If desired, catalysts and/or heating could be utilized to accelerate the rate of reaction.

In certain embodiments of the invention, the polyamine compound is not reacted with any other type of compound other than the aldehyde(s). For example, the polyamine compound is not reacted with a ketone or is not reacted with a fatty acid, but with the aldehyde(s) alone.

Particularly preferred polyamine-aldehyde resins suitable for use in the present invention include those substances classified as CAS 78330-33-3 ("Amines, polyethylenepoly-, benzyl chloride-quaternized, polymers with glyoxal"). Such substances are also obtainable from commercial sources, such as the resin sold under the tradename "Chemquat JL-1060" by C&F Chemicals Inc., of Exton, Pa., as well as the resin sold under the tradename "Corrosion Inhibitor CES-90" by Consulting Engineering Services, LLC, of Spartanburg, S.C.

Typically, acid inhibitor concentrates of the present invention contain from about 0.5 to about 15 weight % (e.g., from about 1 to about 10 weight %) of polyamino-aldehyde resin. As those skilled in the art will appreciate, however, the concentration of resin may be varied as needed or desired depending, among other factors, the extent to which the concentrate will be diluted with aqueous acid to form a metal cleaning or pickling solution as well as the desired concentration of resin in the metal cleaning or pickling solution.

In addition to water and at least one polyamino-aldehyde resin, the acid inhibitor concentrates of the present invention may contain at least one aldehyde-releasing compound and/or at least one ethoxylated fatty amine and/or at least one ethoxylated fatty amine salt and/or at least one acetylenic alcohol. In one embodiment of the invention, however, the concentrate and the metal pickling and cleaning solution prepared therefrom are free of acetylenic alcohol.

The aldehyde-releasing compound is a compound which releases an aldehyde when formulated into a metal pickling or cleaning solution containing aqueous acid and having a relatively low pH (e.g., less than about 4 or less than about 3) and used to pickle and/or clean metal surfaces having scale or other unwanted material deposited thereon. Preferably, the aldehyde which is so released or formed in situ is formaldehyde. The aldehyde-releasing compound preferably is water-soluble. Illustrative examples of such aldehyde-releasing compounds include, but are not limited to, Schiff bases, formal, acetaldehyde dialkyl acetals, trioxane, polyoxymethylenes, paraformaldehyde, paraldehyde, condensation products of ammonia or primary amines with aldehydes, and the like. Preferably, the aldehyde-releasing compound has high water solubility and low volatility. Compounds which are condensation products of ammonia or primary amines such as methyl amine with formaldehyde are preferred, condensation products of ammonia with formaldehyde are more preferred, and hexamethylenetetramine (also sometimes referred to as hexamine, methenamine, urotropin, or urotropine) in particular is most preferred. Salts of such compounds may also be utilized.

Typically, acid inhibitor concentrates of the present invention may contain from about 1 to about 40 weight % (e.g., from about 5 to about 40 weight %) of aldehyde-releasing compound. As those skilled in the art will appreciate, however, the concentration of aldehyde-releasing compound may be varied as needed or desired depending upon, among other factors, the extent to which the concentrate will be diluted with aqueous acid to form a metal cleaning or pickling solution as well as the desired concentration of aldehyde-releasing compound in the metal cleaning or pickling solution.

In certain desirable embodiments of the invention, the weight ratio of aldehyde-releasing compound to polyamino-aldehyde resin in the concentrate (and in metal cleaning and pickling solutions prepared from the concentrate) is within the range of from about 0.5:1 to about 20:1 (e.g., about 1:1 to about 10:1).

Suitable acetylenic alcohols for purposes of the present invention include those organic compounds containing both at least one —OH group and at least one carbon-carbon triple bond per molecule. Preferred acetylenic alcohols are water-soluble and include C3-C10 acetylenic alcohols such as, for example, 1-propyn-3-ol, 1-butyn-3-ol, 1-pentyn-3-ol, 1-heptyn-3-ol, 1-octyn-3-ol, 1-nonyl-3-ol, 1-decyn-3-ol, 1-ethynylcyclohexanol, methylbutynol, 2-butyne-1,4-diol (a particularly preferred acetylenic alcohol), 2-methyl-3-butyn-2-ol, 2,5-dimethyl-3-hexyn-2,5-diol, benzyl butynol, alpha-ethynyl-benzyl alcohol, 5-decyne-4,7-diol, 4-ethyl-1-octyn-3-ol, 2-propyn-1-ol (propargyl alcohol), and the like and mixtures thereof. Alkoxylated derivatives of such acetylenic alcohols (e.g., acetylenic alcohols that have been reacted with 1 to 20 equivalents of one or more epoxides such as ethylene oxide and/or propylene oxide, such as ethoxylated propargyl alcohols) may also be used.

Typically, acid inhibitor concentrates of the present invention may contain from about 0.5 to about 15 weight % (e.g., from about 1 to about 10 weight %) of acetylenic alcohol. As those skilled in the art will appreciate, however, the concentration of acetylenic alcohol may be varied as needed or desired depending, among other factors, the extent to which the concentrate will be diluted with aqueous acid to form a metal cleaning or pickling solution as well as the desired concentration of acetylenic alcohol in the metal cleaning or pickling solution. As mentioned previously, however, in certain embodiments of the invention the acid inhibitor concentrate and the solution prepared therefrom do not contain any acetylenic alcohol.

To optimize the effectiveness and stability of the acid inhibitor concentrates of the present invention, it may be desirable to adjust the pH of the concentrate solution by adding effective amounts of acids or bases. For example, the concentrate may be formulated with one or more acids selected from the group consisting of hydrochloric acid, phosphoric acid, acetic acid, hydroxyacetic acid or other inorganic or organic acids. It will be understood by those skilled in the art that typically at least a portion of the added acid or base will combine with other substances used in the concentrate formulation to form salts, although some free acid or base may also be present in solution.

In one embodiment of the invention, the acid inhibitor concentrate includes one or more wetting agents, which generally help to improve the performance of the cleaning and pickling solutions prepared from the concentrate. Such wetting agents typically are surfactants, including in particular non-ionic and cationic surfactants. The wetting agent can, if desired, be selected so as to impart foaming properties to the metal cleaning and pickling solutions prepared from the acid inhibitor concentrates of the present invention. In one embodiment of the invention, however, one or more wetting agents are selected such that the resulting solution is essentially non-foaming (i.e., exhibits substantially no propensity to form foam when the solution is being used to treat metal substrates). Ethoxylated fatty amines and salts thereof represent a class of especially preferred vetting agents, as at least some members of this class appear to impart synergistic performance improvements to the acid inhibitor concentrates and acidic solutions prepared therefrom. In particular, it has been unexpectedly discovered that pickling or cleaning solutions containing at least certain ethoxylated fatty amines or salts thereof are particularly effective in inhibiting base metal loss (i.e., lowering the etch rate) when the solutions contain relatively high concentrations of iron salts, especially when the solution is being utilized at a relatively high temperature. That is, the presence of such ethoxylated fatty amines or salts thereof tends to reduce the tendency of the pickling or cleaning solution to attack the base metal more aggressively as the solution is repeatedly used and builds up higher levels of iron salts. Illustrative ethoxylated fatty amines include amines substituted with one or more C6-C22 linear as well as branched aliphatic groups (including alkyl groups as well as alkylene groups containing one or more carbon-carbon double bonds per alkylene group) that have been reacted (ethoxylated) with from about 2 to about 20 moles of ethylene oxide per mole of amine as well as salts thereof (e.g., carboxylate salts such as acetate salts). The ethoxylated fatty amine may be based on a diamine (e.g., a compound containing two nitrogen atoms per molecule, at least one of which is substituted with one or more C6-C22 saturated and/or unsaturated alkyl groups). Specific examples of useful ethoxylated fatty amines include ethoxylated coco amines, ethoxylated tallow amines, ethoxylated hydrogenated tallow amines, ethoxylated dodecylamines, ethoxylated octadecylamines, ethoxylated soya amines, ethoxylated oleyl amines, ethoxylated stearic amines, ethoxylated N-tallow diamines, ethoxylated N-oleyl diamines, and salts thereof (for example, carboxylate salts such as acetate salts). Ethoxylated coco amines containing an average of from about 8 to about 16 (e.g., from about 10 to about 14) moles of reacted ethylene oxide per mole of coco amine, ethoxylated tallow amines containing an average of from about 6 to about 14 (e.g., from about 8 to about 12) moles of reacted ethylene oxide per mole, of tallow amine as well as salts of such ethoxylated coco amines or ethoxylated tallow amines are particularly preferred. Such wetting agents are readily available as commercial products, including surfactants sold under the tradename "Chemeen" by Chemex, Inc., surfactants sold under the tradename "Varonic" by the Goldschmidt Chemical Corporation, as well as surfactants sold under the tradenames "Ethomeen" and "Ethoduomeen" by Akzo Nobel. Other types of wetting agents that can be utilized include, for example, ethoxylated nonylphenols, ethoxylated alcohols, ethoxylated fatty acids, fluorosurfactants and the like. In one embodiment of the invention, however, the concentrate and the metal cleaning and pickling solution are free of fluorosurfactant.

Suitable ethoxylated fatty amines can have the formula:

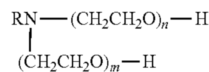

wherein R is a straight-chain or branched, saturated or unsaturated aliphatic group having from 6 to 22 carbon atoms, n and in are the same or different and each preferably are at least 1 and n+m is from 2 to 20. Mixtures of such compounds may also be utilized.

Typically, acid inhibitor concentrates of the present invention contain from about 0.1 to about 5 weight % (e.g., from about 0.5 to about 3 weight %) of wetting agent (in particular, ethoxylated fatty amine). As those skilled in the art will appreciate, however, the concentration of wetting agent may be varied as needed or desired depending, among other factors, the extent to which the concentrate will be diluted with aqueous acid to form a metal cleaning or pickling solution as well as the desired concentration of wetting agent in the metal cleaning or pickling solution.

In certain desirable embodiments of the invention, the weight ratio of wetting agent to polyamino-aldehyde resin in the concentrate (and in metal cleaning and pickling solutions prepared from the concentrate) is from about 0.05:1 to about 3:1 (e.g., about 0.1 to about 2:1). In other desirable embodiments of the invention, the weight ratio of wetting agent to aldehyde-releasing compound in the concentrate (and in metal cleaning and pickling solutions prepared from the concentrate) is from about 0.005:1 to about 1:1 (e.g., about 0.02 to about 0.5:1).

To increase the water solubility of the polyamino-aldehyde resin in the concentrate, it may be desirable to acidify the concentrate by adding an acid such as hydrochloric acid (at least a portion of the added acid may form salts with the amine groups of the polyamino-aldehyde resin). However, a highly acidic solution may tend to accelerate the decomposition of the aldehyde-releasing compound to an unacceptable extent (thereby releasing aldehyde prematurely, that is, prior to the time the concentrate is used to make up a cleaning or pickling solution by combining with aqueous acid). If the aldehyde-releasing compound releases formaldehyde (a regulated substance), for example, this may mean that the concentrate has to be specially handled to order to avoid building up unacceptably high concentrations of formaldehyde. For this reason, it may be desirable to package the concentrate as a two part system or kit, wherein one part comprises an aqueous solution of the aldehyde-releasing compound and, optionally, a wetting agent (such solution having a pH that is moderately alkaline, e.g., about 9 to about 10) and the second part comprises an acidified aqueous solution comprising the polyamino-aldehyde resin (i.e., the aldehyde-releasing compound and the polyamino-aldehyde resin are kept separate until shortly before use, when the two parts of the concentrate are combined and diluted with aqueous acid to prepare the metal cleaning or pickling solution). The second part may optionally contain a wetting agent.

If maintaining the free formaldehyde level below 0.1 weight % in an acid inhibitor concentrate in accordance with the present invention is desired, it will generally be preferred to adjust the pH so that it is greater than about 7.

The acid inhibitor concentrates of the present invention will find use in preparing acid cleaning and pickling solutions that are effective in cleaning metal surfaces of unwanted metal oxide scale and other undesirable corrosion products. Examples of such cleaning solutions are those containing mineral and/or organic acids such as, for example, hydrochloric acid, phosphoric acid, hydrofluoric acid, sulphamic acid, sulphonic acid, sulphuric acid, acetic acid, citric acid, formic acid, glycolic acid, oxalic acid and mixtures thereof.

The concentration of acid in the metal cleaning or pickling solution may be adjusted as needed in order to achieve the desired level of cleaning activity. For example, where hydrochloric acid is utilized as the acid, typically the HCl content of the solution is maintained within the range of from about 1 to about 30% (e.g., about 5 to about 20%) on a weight/volume basis. Typically, the acid(s) selected and the concentration of such acid(s) in the metal cleaning or pickling solution are effective to provide a highly acidic solution, e.g. a solution having a pH of less than about 3, less than about 2, or less than about 1.

The acid inhibitor concentrates described herein can be utilized to particularly good advantage in applications involving strip line, continuous, and batch hydrochloric acid pickling of ferrous surfaces, that is, in applications wherein iron tends to build up in the cleaning solution. Various types of steel may be effectively cleaned of scale and the like by treatment with HCl-containing solutions prepared from the present acid inhibitor concentrates, for example. However, the acid inhibitor concentrates are also useful in other types of cleaning and pickling solutions, such as those, for example, that are used to clean aluminum or aluminum alloy surfaces or zinc or zinc alloy surfaces.

In general, the acid inhibitor concentrates of the present invention are incorporated into acidic cleaning solutions in any amount effective to reduce the tendency of the acid to attack and corrode without significantly interfering with the cleaning operation performed by the acid. The optimum amount of acid inhibitor concentrate to be combined with an aqueous acid solution will vary depending on a number of factors, including the particular active components present in the concentrate (e.g., the particular polyamino-aldehyde resin, the particular aldehyde-releasing compound, the particular wetting agent, etc.), the type and concentration of acid, the type of metal being treated, as well as the treatment conditions (e.g., contact time, temperature).

Typically, however, one part by volume of the acid inhibitor concentrates of the present invention is diluted with about 50 to about 50,000 parts by volume of aqueous acid. That is, the acid inhibitor concentrate typically is combined with an aqueous acid solution at a concentration of from about 0.001 to about 2 (e.g., about 0.005 to about 0.5) % on a volume/volume basis. If the metal cleaning or pickling solution is to be utilized at a relatively high temperature, the amount of concentrate present in the solution will generally be higher than if the solution is to be contacted with metal surfaces at relatively low temperatures. The concentrate may first be combined with a relatively concentrated acid solution (e.g., 37% concentrated HCl) and the resulting mixture then diluted with water to yield the working solution that will be used to clean and/or pickle a metal surface. Such a mixture may also conveniently be used to replenish an existing solution where the acid concentration and/or the concentrations of acid inhibiting substances have fallen below the desired levels. Alternatively, the concentrate may be combined directly with an aqueous solution having the acid concentration desired for purposes of the cleaning and pickling solution.

In certain embodiments, the metal cleaning or pickling solution may contain concentrations of components within the following ranges:

| | |
|---|---|
| Polyamino-aldehyde resin | 0.5-500 ppm (e.g., 1-200 ppm) |
| Aldehyde-releasing compound | 0-1000 ppm (e.g., 5-500 ppm) |
| Wetting agent | 0-200 ppm (e.g., 0.5-100 ppm) |
| Acetylenic alcohol | 0-700 ppm (e.g., 5-300 ppm) |

The above-stated concentration ranges are based on the amounts of the individual components as initially charged to the solution. Certain of the components, in particular the aldehyde-releasing compound, are believed to undergo chemical reaction or transformation once the solution has been formed and/or once the solution is placed into use for cleaning and/or pickling metal surfaces. For example, without wishing to be bound by theory, it is believed that the aldehyde-releasing compound decomposes to form aldehydes and other decomposition products after being combined with aqueous acid to form the metal pickling or cleaning solution, since such solutions are typically highly acidic and the aldehyde-releasing compound is known to be unstable at low pH (e.g., where the pH is less than 3).

Generally speaking, cleaning and pickling solutions containing the acid inhibitor concentrates of the present invention can be utilized to treat any of a variety of metals. Examples of metal surfaces include both pure metals and alloys such as, for example, aluminum (including aluminum alloys), magnesium, zinc, titanium, iron, copper, steel (including, for example, cold rolled steel, hot rolled steel, galvanized steel, alloy steel, carbon steel), bronze, stainless steel, brass and the like. For example, the substrate to be contacted with the solution may be comprised of at least 50 percent by weight of aluminum, zinc or iron. The substrate comprising the metal surface to be treated in accordance with the present invention can take any form, including, for example, wire, wire mesh, sheets, strips, panels, shields, vehicle components, casings, covers, furniture components, aircraft components, appliance components, profiles, moldings, pipes, frames, tool components, bolts, nuts, screws, springs or the like. The metal substrate can contain a single type of metal or different types of metal joined or fastened together in some manner. The substrate to be treated in accordance with the process of the present invention may contain metallic portions in combination with portions that are non-metallic, such as plastic, resin, glass or ceramic portions.

The metal cleaning or pickling solutions prepared from the acid inhibitor concentrates of the present invention exhibit good consistent inhibition of metal etching even when the solution is operated at relatively high temperatures over an extended period of time and/or contains a high iron loading level. For example, the solution may be maintained at temperatures of from ambient (i.e., about 20 degrees C.) to about 100 degrees C. The metal surface with scale or other material deposited or adhered thereon which is to be cleaned and/or pickled is contacted with the solution for a time and at a temperature effective to remove the desired amount of scale or other material from the metal surface, leaving a cleaned and/or descaled and/or pickled surface with reduced loss (etching) of the metal itself as compared to contacting with the same type of solution which does not contain an acid inhibitor concentrate in accordance with the present invention. The solution may be brought into contact with the metal surface using any suitable or known method such as, for example, dipping (immersion), brushing, spraying, roll coating, wiping, and the like. Once the solution has been in contact with the metal surface for the desired period of time, the substrate having the metal surface may be removed from contact with the bulk of the solution (for example, by extracting the substrate from a tank or vat containing the solution). Residual solution clinging to the metal surface may be allowed to drain off the surface or removed by other means such as wiping. The metal surface may be rinsed with water or another solution to remove any remaining solution and/or to neutralize any residual acid and/or to prevent "flash rusting" of the freshly exposed metal surface. The metal pickling or cleaning solutions of the present invention are capable of producing easy to rinse metal surfaces exhibiting the "water sheeting" phenomena that clean, non-fouled, high energy metal surfaces typically exhibit. The "water sheeting" exhibited by rinsed metal surfaces processed in accordance with the present invention distinguishes the present invention from many acid inhibitor technologies known in the prior alt, which tend to produce a very hydrophobic "water beading" surface (i.e., a metal surface on which water forms distinct separate beads). "Water beading" on cleaned or pickled metal surfaces indicates that thin organic films have remained on the surface after the rinse step; such residual films may adversely affect and/or complicate further downstream processing of the metal-containing article.

End uses of the compositions of the present invention include, but are not limited to, chemical and electrolytic pickling operations, acid dipping processes, plant wash-out procedures, cleaning of metal surfaces of industrial equipment (e.g., cleaning industrial boilers, heat exchangers and condensers), and oil well acidizing operations.

EXAMPLES

Example 1

To prepare a polyamino-aldehyde resin for use in formulating an acid inhibitor concentrate in accordance with the present invention, 100 parts by weight of an aqueous solution of CHEMQUAT SP-1060 (a polyethylenepolyamine quaternized with benzyl chloride; 60% solids) is combined with 30 parts by weight of a 40 weight % aqueous solution of glyoxal. An exothermic reaction is observed, producing a dark colored solution exhibiting a strong absorption at 1640 $cm^{-1}$ in the FTIR spectrum.

Example 2

To prepare an acid inhibitor concentrate in accordance with the present invention, the following components are combined and mixed (preferably in the following order of addition) to yield a homogeneous solution:

| | |
|---|---|
| Deionized water | 65.05 wt. % |
| Hexamethylenetetramine | 16.0 wt. % |
| CHEMEEN C-12G ethoxylated coco amine | 1.75 wt. % |
| Hydrochloric acid (20 degree baume) | 9.75 wt. % |
| Acetic acid (56%) | 0.45 wt. % |
| Corrosion Inhibitor CES-90[1] | 7.0 wt. % |

[1]supplied by Consulting Engineering Services, LLC; reported to contain 59-61% benzyl chloride quaternized polyethylenepolyamine polymers with glyoxal (CAS 78330-33-3), less than 4% tetraethylenepentamine, less than 1% triethylenetetramine, and 39-41% water.

To prepare metal cleaning or pickling solutions in accordance with the present reference, 1 part by volume of the above-described acid inhibitor concentrate may, for example, be combined with from 200 to 20,000 parts by volume of an aqueous solution containing 10% weight/volume HCl. Other acids as well as other concentrations of HCl (e.g., about 0.5 to about 20% weight/volume) may also be utilized.

The effectiveness of the pickling or cleaning solutions of the present invention in reducing the amount of base metal loss when the solutions are used to treat metal surfaces is demonstrated in the following examples.

Example 3

Solution A was prepared by combining 0.1710 g CHEMQUAT SP-1060 quaternized polyethylenepolyamine with 2 L 10% weight/volume aqueous hydrochloric acid.

Solution B was prepared by combining 0.222 g of the polyamino-aldehyde resin of Example 1 with 2 L 10% weight/volume aqueous hydrochloric acid.

Solution C was prepared by first preparing a mixture of 130 parts by weight of the polyamino-aldehyde resin of Example 1 with 20 parts by weight of CHEMEEN C-12G ethoxylated fatty amine and then combining 0.257 g of this mixture with 2 L 10% weight/volume hydrochloric acid.

Cold rolled steel (1008 alloy) coupons measuring 0.032×2×4 inches were wiped with fresh isopropyl alcohol, dried, and weighed (to the nearest 0.1 mg). The test panels (2 per test) were suspended on plastic coated hooks through ¼" punched holes and were placed for 30 minutes in each of Solutions A, B and C, the solutions being maintained at 110 degrees F., stirred with a magnetic stir bar (solution flow rate@ panels 3-5 feet/second), and covered with water-cooled watch glasses. After the exposure, the panels were immediately rinsed in a fresh overflowing water bath, wetted with isopropyl alcohol and then firmly wiped clean/dry with a fresh clean soft paper wiper before re-weighing: The test panels exhibited the following amount of base metal loss:

Solution A: 0.5040 $lb/ft^2/hr$

Solution B: 0.2935 $lb/ft^2/hr$

Solution C: 0.2773 $lb/ft^2/hr$

These results demonstrate that the reaction product of quaternized polyethylenepolyamine and glyoxal (Solution B) was much more effective in inhibiting base metal loss than the unreacted quaternized polyethylenepolyamine (Solution A) and that the presence of an ethoxylated fatty amine (Solution C) also yields additional inhibition enhancement.

Example 4

Solutions A-1, B-1, and C-1 were prepared by adding 0.69 g hexamethylenetetramine to each of Solutions A, B, and C, respectively, in Example 3.

Following the same test protocol described above in Example 3, cold rolled steel coupons exposed to Solutions A-1, B-1, and C-1 exhibited the following amount of base metal loss:

Solution A-1: 0.1606 $lb/ft^2/hr$

Solution B-1: 0.1220 $lb/ft^2/hr$

Solution C-1: 0.0824 $lb/ft^2/hr$

These results demonstrate that the presence of hexamethylenetetramine further enhances the effectiveness of the quaternized polyethylenepolyamine-glyoxal resin in inhibiting base metal loss in a metal pickling or cleaning solution containing non-oxidizing acid (compare Solution B-1 with Solution B and Solution C-1 with Solution C).

Solutions B-2 and C-2 were prepared by adding 0.24 g 1,4-butynediol to each of Solutions B-1 and C-1, respectively.

Following the same test protocol described above, cold rolled steel coupons exposed to Solutions B-2 and C-2 exhibited the following amount of base metal loss:

Solution B-2: 0.0710 $lb/ft^2/hr$

Solution C-2: 0.0494 $lb/ft^2/hr$

These examples demonstrate the benefits of including an acetylenic alcohol in the acid inhibitor compositions of the present invention.

Example 5

The effectiveness of the acid inhibitor concentrates of the present invention in inhibiting base metal loss during cleaning of an aluminium-containing substrate is demonstrated by the following examples. Two baths were prepared as follows:

Bath 1: 19.0 mL 37% HCl diluted in 181 g deionized water.

Bath 2: 20 mL of an inhibitor/acid mixture (the mixture being prepared from 13.4 g deionized water, 72.6 mL 37% HCl, and 0.475 g of an acid inhibitor concentrate in accordance with Example 2) diluted in 180 g deionized water.

Each bath was placed in a glass beaker at room temperature. Aluminum panels (3003 aluminum alloy; 2"×4"×0.025") were cleaned with SCOTCH-BRITE pads and water, then wiped with isopropanol, wiped dry and then weighed (to nearest 0.0001 g). The panels were then placed in each of the beakers so that about two-thirds of each panel was immersed in the bath.

The panel immersed in Bath 1 exhibited significantly more gas evolution than the panel immersed in Bath 2. After 6 minutes of immersion, the weight of the panel in Bath 1 had decreased by 0.0066 g, while the weight of the panel in Bath 2 had decreased by 0.0006 g (91% inhibition). Prior to weighing, the panels were rinsed and then wiped with isopropanol. After an additional 60 minutes of immersion, the weight loss of the panel in Bath 1 (which was cloudy and grey and had attained a temperature of 36 degrees C. due to the exotherm created by dissolution of the metal) was 1.4436 g and the weight loss of the panel in Bath 2 (which was clear and 67 degrees F. in temperature) was 0.0137 g (99.05% inhibition).

The panel that had been immersed in Bath 1 had a significant amount of smut on its surface, while the panel that had been immersed in Bath 2 had very little smut on its surface.

Example 6

To demonstrate the effectiveness of the inventive compositions in inhibiting the etching of a variety of aluminum alloy surfaces by hydrochloric acid, the following test solutions were prepared.

Control: 2.0% (w/v) hydrochloric acid.

Invention: The acid inhibitor concentrate of Example 2 was diluted to 0.05% (v/v) in 2.0% (w/v) hydrochloric acid.

Test panels of various aluminum alloys measuring 2" by 4" (two for each test) were cleaned using a SCOTCH-BRITE pad and water, then dried and weighed to 0.1 mg accuracy. The panels were thereafter placed in 2 liters of the agitated test solutions (freshly prepared for each test and maintained at the temperatures shown in Table 1) for the times shown in Table 1. The panels were then cleaned, dried and the metal loss in lbs/ft$^2$/day calculated and compared to the control to determine the % inhibition attained. The results shown in Table 1 demonstrate that the bath in accordance with the invention generally exhibited a much higher degree of acid etch inhibition as compared to the control over a range of temperatures typically encountered during metal cleaning operations, no matter what type of aluminum alloy substrate was employed.

TABLE 1

| Substrate | % Inhibition, 38° C. | % Inhibition, 49° C. | % Inhibition, 60° C. |
|---|---|---|---|
| 1100 Al Alloy | 82.0 | 72.3 | 43.9 |
| 2024 T3 Al Alloy | 91.8 | 95.0 | 95.8 |
| 3003 Al Alloy | 90.5 | 91.1 | 69.9 |
| 5052 Al Alloy | 85.5 | 82.1 | 73.3 |
| 6061 Al Alloy | 96.3 | 98.3 | 96.8 |
| 7075 T6 Al Alloy | 81.0 | 57.8 | 63.6 |
| Contact Time in Minutes (Control/Invention) | 60/240 | 30/90 | 15/60 |

Example 7

To demonstrate the effectiveness of the inventive compositions in inhibiting the etching of pure zinc metal surfaces by phosphoric acid, the following test solutions were prepared.

Control: 5.0% (v/v) phosphoric acid.

Invention: The acid inhibitor concentrate of Example 2 was diluted to 0.05% (v/v) in 5.0% (w/v) phosphoric acid (1.06 g/2 L).

Test panels of pure zinc metal measuring 2" by 2" (two for each test) were cleaned using a SCOTCH-BRITE pad and water, then dried and weighed to 0.1 ng accuracy. The panels were subsequently suspended in 2 liters of the agitated test solutions (freshly prepared for each test) maintained at the temperatures shown in Table 2 for the times also shown in Table 2. The panels were then cleaned and dried and the average metal loss in lbs/ft$^2$/day was calculated and compared to the control to determine the % inhibition attained. The results shown in Table 2 demonstrate that the bath in accordance with the invention exhibited an exceptionally high degree of acid etch inhibition as compared to the control.

TABLE 2

| Test Solution | % Inhibition, 38° C. | % Inhibition, 49° C. | % Inhibition, 60° C. |
|---|---|---|---|
| Invention | 95.6 | 95.1 | 91.9 |
| Contact Time in Minutes (Control/Invention) | 60/180 | 30/90 | 15/60 |

Example 8

This example illustrates the effectiveness of compositions in accordance with the present invention in inhibiting the acid etch of aluminum surfaces, particularly when such compositions contain both an aldehyde-releasing compound and an ethoxylated fatty amine.

The following baths were prepared:

Invention A—0.0742 g CES-90 (supplied by Consulting Engineering Services, LLC; reported to contain 59-61% benzyl chloride quaternized polyethylenepolyamine polymers with glyoxal (CAS 78330-33-3), less than 4% tetraethylenepentamine, less than 1% triethylenetetramine, and 39-41% water) and 0.1696 g HMTA in 2 liters of 2.0% (w/v) HCl.

Invention B—0.0186 g CHEMEEN C-12G ethoxylated coco amine was added to the bath of Invention A after such bath had been used (some acid consumed).

Two 2"×4" panels of 3003 aluminum alloy (freshly cleaned using a SCOTCH-BRITE pad) were placed in each agitated bath, maintained at the temperature indicated in Table 3. After contact times identical to those listed in Table 1, the amount of metal loss was determined and the % inhibition calculated as compared to a control (2.0% w/v HCl, no inhibitor). The results obtained (Table 3) show that the use of a quaternized polyethylenepolyamine that has been reacted with aldehyde (glyoxal) provides effective inhibition of acid etch, particularly at elevated temperatures and when used in combination with both HMTA and an ethoxylated fatty amine.

TABLE 3

| Temperature, ° C. | Invention A, % Inhibition vs. Control | Invention B, % Inhibition vs. Control |
|---|---|---|
| 38 | 89.3 | 92.3 |
| 49 | 87.6 | 90.6 |
| 60 | 63.0 | 79.9 |

What is claimed is:

1. An acid inhibitor concentrate comprising water, at least one quaternized polyamino-aldehyde resin and at least one compound selected from the group consisting of aldehyde-releasing compounds, ethoxylated fatty amines, ethoxylated fatty amine salts and acetylenic alcohols.

2. The acid inhibitor concentrate of claim 1 wherein said aldehyde-releasing compounds comprise at least one formaldehyde-releasing compound.

3. The acid inhibitor concentrate of claim 1 wherein the said aldehyde-releasing compounds comprise at least hexamethylenetetramine or a salt thereof.

4. The acid inhibitor concentrate of claim 1 wherein the acid inhibitor concentrate comprises at least one of: at least one polyethylenepolyamine-aldehyde resin, at least one polyamino-glyoxal resin and at least one polyethylenepolyamine-glyoxal resin.

5. The acid inhibitor concentrate of claim 1 wherein the acid inhibitor concentrate comprises at least one polyethylenepolyamine-glyoxal resin obtained by reacting a quaternized polyethylenepolyamine with glyoxal.

6. The acid inhibitor concentrate of claim 5 wherein the quaternized polyethylenepolyamine is obtained by reacting a polyethylenepolyamine with benzyl chloride.

7. The acid inhibitor concentrate of claim 1, comprising:

a. at least one ethoxylated fatty amine or salt thereof; and b. at least one aldehyde-releasing compound or at least one acetylenic alcohol.

8. The acid inhibitor concentrate of claim 1, comprising at least one quaternized polyethylenepolyamine-glyoxal resin, hexamethylenetetramine or salt thereof, and at least one ethoxylated fatty amine or salt thereof.

9. The acid inhibitor concentrate of claim 1, comprising less than 1 weight percent free formaldehyde.

10. The acid inhibitor concentrate of claim 1, wherein said acetylenic alcohols comprise at least 2-butyne-1,4-diol.

11. A solution comprising water, at least one non-oxidizing acid, at least one quaternized polyamino-aldehyde resin, and at least one compound selected from the group consisting of aldehyde-releasing compounds, ethoxylated fatty amines, ethoxylated fatty amine salts and acetylenic alcohols.

12. The solution of claim 11 wherein the solution comprises at least one formaldehyde-releasing compound.

13. The solution of claim 11 wherein the solution comprises at least one polyethylenepolyamine-glyoxal resin obtained by reacting a quaternized polyethylenepolyamine with glyoxal.

14. The solution of claim 13 wherein the quaternized polyethylenepolyamine is obtained by reacting a polyethylenepolyamine with benzyl chloride.

15. The solution of claim 11, comprising at least one quaternized polyethylenepolyamine-glyoxal resin, hexamethylenetetramine or salt thereof, and at least one ethoxylated fatty amine or salt thereof.

16. The acid inhibitor concentrate of claim 1, wherein said quaternized polyamino-aldehyde resin is present in the concentrate in an amount of about 0.5 to about 15 wt. % and said aldehyde-releasing compounds is present in the concentrate in an amount of about 1 to about 40 wt. %.

17. The acid inhibitor concentrate of claim 16, wherein said aldehyde-releasing compounds comprises at least hexamethylenetetramine or a salt thereof.

18. The acid inhibitor concentrate of claim 17, wherein said quaternized polyamino-aldehyde is present in the concentrate in an amount of about 1 to about 10 wt. % and said aldehyde releasing compounds is present in the concentrate in an amount of about 5 to about 40 wt. % and the weight ratio of said aldehyde-releasing compounds to said polyamino-aldehyde resin is from about 1:1 to 10:1.

19. The acid inhibitor concentrate of claim 16 further comprising about 0.5 to about 15 wt. % of acetylenic alcohol.

20. The acid inhibitor concentrate of claim 1 wherein the acid inhibitor concentrate comprises at least one polyethylenepolyamine-aldehyde resin.

21. The acid inhibitor concentrate of claim 1 wherein the acid inhibitor concentrate comprises at least one polyamino-glyoxal resin.

22. The acid inhibitor concentrate of claim 1 wherein the acid inhibitor concentrate comprises at least one polyethylenepolyamine-glyoxal resin.

23. The acid inhibitor concentrate of claim 1, comprising at least one ethoxylated fatty amine or salt thereof and at least one aldehyde-releasing compound.

24. The acid inhibitor concentrate of claim 1, wherein said acid inhibitor concentrate is free of acetylenic alcohol.

25. The acid inhibitor concentrate of claim 1, wherein said acid inhibitor concentrate is free of fluorosurfactant.

26. The acid inhibitor concentrate of claim 1, wherein said acid inhibitor concentrate has a pH of from about 4 to about 6.

27. The acid inhibitor concentrate of claim 1, wherein said acid inhibitor concentrate has a pH of greater than about 7 and a free formaldehyde content of less than about 0.1 weight percent.

28. The acid inhibitor concentrate of claim 1, comprising at least one ethoxylated fatty amine or salt thereof and at least one acetylenic alcohol.

29. The solution of claim 11 wherein said aldehyde-releasing compounds comprise hexamethylenetetramine or a salt thereof.

30. The solution of claim 11 wherein the solution comprises at least one polyethylenepolyamine-aldehyde resin.

31. The solution of claim 11 wherein the solution comprises at least one polyamino-glyoxal resin.

32. The solution of claim 11 wherein the solution comprises at least one polyethylenepolyamine-glyoxal resin.

33. The solution of claim 11, comprising at least one ethoxylated fatty amine.

34. The solution of claim 11, wherein said solution comprises hydrochloric acid.

35. The solution of claim 11, wherein said solution has a pH of less than about 3.

36. The solution of claim 11, wherein said solution is comprised of 2-butyne-1,4-diol.

* * * * *